US011945378B2

(12) United States Patent
Hick

(10) Patent No.: US 11,945,378 B2
(45) Date of Patent: Apr. 2, 2024

(54) METHOD FOR MANUFACTURING A MOLDED VEHICLE TRIM ELEMENT

(71) Applicant: AGC GLASS EUROPE, Louvain-la-Neuve (BE)

(72) Inventor: Robert Hick, Chenee (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 188 days.

(21) Appl. No.: 17/434,807

(22) PCT Filed: Mar. 5, 2020

(86) PCT No.: PCT/EP2020/055831
§ 371 (c)(1),
(2) Date: Aug. 30, 2021

(87) PCT Pub. No.: WO2020/178383
PCT Pub. Date: Sep. 10, 2020

(65) Prior Publication Data
US 2022/0161740 A1    May 26, 2022

(30) Foreign Application Priority Data
Mar. 5, 2019  (EP) .................................... 19160844

(51) Int. Cl.
*B29C 45/14* (2006.01)
*B60R 13/02* (2006.01)
*B29K 709/08* (2006.01)
(52) U.S. Cl.
CPC ........ *B60R 13/02* (2013.01); *B29C 45/14311* (2013.01); *B29C 45/14434* (2013.01);
(Continued)

(58) Field of Classification Search
CPC ......... B29C 45/14311; B29C 45/14434; B29C 45/14811; B29C 45/14778;
(Continued)

(56) References Cited

U.S. PATENT DOCUMENTS 11,110,685 B2 * 9/2021 Sasaki ..................... B32B 15/20
2014/0004314 A1    1/2014 Durand et al.
(Continued)

FOREIGN PATENT DOCUMENTS

EP    2 674 274 A1    12/2013
EP    3 118 174 A1     1/2017
(Continued)

OTHER PUBLICATIONS

International Search Report dated Apr. 28, 2020 in PCT/EP2020/055831 filed Mar. 5, 2020, therein, 3 pages.

*Primary Examiner* — Edmund H Lee
(74) *Attorney, Agent, or Firm* — Oblon, McClelland, Maier & Neustadt, L.L.P.

(57) ABSTRACT

A method for manufacturing a molded vehicle trim element including the following steps: (i) providing a carrier plate in a mold for injection molding including a mobile core of the mold and cavity of the mold to give the final shape of the vehicle trim element, (ii) providing a glass panel in the mold having at least a first region to be bent, (iii) cold bending the glass panel inside the mold in a requested shape, (iv) injecting a soft material to form the vehicle trim element made of bent carrier plate and glass panel fixed together via the molding material, and (v) removing the vehicle trim element from the mold.

14 Claims, 4 Drawing Sheets

(52) U.S. Cl.
CPC ............... *B29C 45/14811* (2013.01); *B29C 2045/14155* (2013.01); *B29K 2709/08* (2013.01)

(58) Field of Classification Search
CPC .... B29C 45/14508; B29C 2045/14155; B29C 2045/1454
See application file for complete search history.

(56) References Cited

U.S. PATENT DOCUMENTS

| | | | |
|---|---|---|---|
| 2016/0306451 A1* | 10/2016 | Isoda | .................. B32B 27/36 |
| 2018/0208131 A1 | 7/2018 | Mattelet et al. | |
| 2019/0329531 A1* | 10/2019 | Brennan | ............. B29C 45/1418 |
| 2020/0016806 A1* | 1/2020 | Brennan | ................. C03B 40/00 |

FOREIGN PATENT DOCUMENTS

| | | | |
|---|---|---|---|
| JP | | 4-338517 A | 11/1992 |
| WO | WO 2018/005646 A1 | | 1/2018 |

\* cited by examiner

METHOD FOR MANUFACTURING A MOLDED VEHICLE TRIM ELEMENT

TECHNICAL FIELD

The application relates to a method for fabricating a vehicle interior trim part. In addition, the application relates to a vehicle trim element.

BACKGROUND

It is known to use glass panels in vehicle interiors, for example as a mirror or as instrument glass. Glass is known for its high-quality optical and haptic appearance. Further, displays are commonly installed in vehicle interiors to provide a driver or a passenger with information. In some applications, a display may be arranged behind an optically transparent glass panel, e.g., to protect the display from food or beverage spills or from scratches.

However, glass panel today may be not only used as an optically transparent glass panel, e.g., to protect the display but also as a glass interior trim element into a motor vehicle or a center console or a glass exterior trim element also known as glass applique.

Interior or exterior trim vehicle refers to the items that can be added to the interior or exterior of an automobile or a motor vehicle in general (car, bus, train . . . ) to increase its appeal. There are several types of vehicle trim. Some are used to protect some part of the interior vehicle from unwanted damage that can be caused by the passenger, while others are simply for aesthetics.

However, today car manufacturers tend to use more and more glass inside and/or outside the vehicle and particularly as cover glass of the dashboard and this particularly to have display behind the cover as for example analog-digital hybrid touch panel apparatus and a recognition method thereof.

Also, not only for aesthetic point of view but particularly for adding more and more functionalities on some part on interior and/or exterior of vehicle, particularly on trim elements, car manufacturers are looking for replacing plastic, wood . . . trim element by glass which are more resistant to scratches and because more functionalities may be added on them.

Also, in many vehicles and particularly cars, a vehicle console is disposed between left and right front seats. Typically, the center console is anchored to the dashboard of the car and extends on that part. The center console can also be installed to the left and right of the back seats. In order to make the interior of the car more beautiful and comfortable, usually decorated panels covering the exposed parts of the center console (such as a CD player, controls for audio, climate, the infotainment etc. . . . ) are mounted on the center console and particularly on the upper side of the center console.

Generally, the top part of the center console is made of plastics, polycarbonate elements (plastics materials are used as a cover to the whole console system). This solution is often aesthetic but does not allow adding directly some functions on the center console as such "touch screen functionalities" with good efficiency . . . . Furthermore, the disadvantages of having a plastics molded center console are the following: since there is no touch functionality permitted with plastics, an overload of useless buttons must be installed on the console. At the end of the day, the multitude of buttons confuses the driver (safety aspect). Additionally, because there is no seamless effect, it is more difficult to clean the center console as the dust is incrusted around the buttons, etc. . . . (hygiene downside). The plastic material used to cover the center console is hardly recyclable whereas glass is endlessly recyclable (environmental issue). The molding process of the plastic parts results in plastics ending up as wastes (recyclable plastics prices are not competitive with newer plastics prices, therefore there is currently no viable alternative to address this environmental concern). In general, plastics material used a glass cover are not highly resistant to UV and the transparent tint turns into yellow with time (deterioration of the design). Additionally, in order to present a similar stiffness than glass, a cover made of plastics will be heavier than one made of glass. Therefore, plastics material solutions are not optimal for this car part in order to lighten the car. As technology cycles go faster and faster, a glass center console would allow flexibility for IT upgrades to be made and allows for seamless connectivity with nomadic devices. By having a glass center console, it would allow to reconcile the many different softwares that are typically supported by the car into one Operating System located and commanded from the same place. Additionally, in contrast to most of the materials currently used as parts of the center console, glass can support the use of ambient light (improving the comfort/convenience of the passengers). Furthermore, the passenger does not want to see anymore plastic in his interior's car similarly to his house or his office interior's.

The current interior decorative or functional parts are mainly made of decorative plastics. Therefore, fixation elements can be directly integrated to these parts. However, the plastic parts have the disadvantage to be damaged when being touched and over the life time of the vehicle, due to their low resistance to abrasion. Furthermore, the effect of having plastic in the car for the user interface (visible decoration or functional panel) is not optimal for the high-end finishing, plastics being considered as a low quality material. Another criteria is the feeling when touching plastic, user feels to touch a weak material, and the sensation at fingertips is hot and soft, giving the impression of a low end material. The current solutions therefore do not need to integrate specific intermediate parts for assembly.

Thus, glass trim elements or a glass console are preferred to have a better aesthetic and allow to increase the appeal of the vehicle. Glass trim elements are more difficult to fix to the interior's vehicle because they must comply with safety rules.

Glass trim elements are preferably curved glass panels. Curved glass panels may be formed by first heating a glass panel to a temperature above the softening point of the glass panel. Subsequently the glass panel may be deformed by either actively bending the glass panel using a bending device or by letting the glass bend due to its own weight. Alternatively, cold forming processes may be used when bending glass panels. These processes are known to consume less energy and time. In a cold forming process, a glass panel is typically bent at room temperature on a curved frame. After bending the glass panel, e.g., when a curvature of the glass panel corresponds to a curvature of the curved frame, the glass panel is strained and tends to gradually take back its initial shape. Therefore, the bent glass panel typically needs to be mechanically fixed to the curved frame after bending to retain the curvature of the glass panel.

A multitude of flexible, anorganic glass films are layered with an interposition of an adhesive layer between the glass films. In a molding tool the glass layers are compressed and held at a temperature below a glass transition temperature until the adhesive is cured such that a self-supporting molded glass part is formed.

When a glass panel comprising a functional element such as a display is bent, problems may occur relating to the strain exerted on a bonding interface between the functional element and the glass panel or on the functional element itself by the bending process. Consequently, a detachment or breakage of the functional element may occur. Similar problems may occur when a glass panel comprises a hole for receiving a functional element such as a display, an air vent, or a rotary knob. The panel is weakened due to the hole, and the stress in the panel around the hole may exceed critical values with the consequence of unwanted deformation or even breakage.

Today, double sided tape is mainly used in order to fix thin glass on a support called carrier. This carrier is then used to make the assembly of the module created in the vehicle. This allows a full surface connection between the glass and generally the plastic part used as carrier which is highly recommended for passing homologation tests. This solution leads to an acceptable bonding quality. However, the process used to make the assembly is difficult to implement industrially. Indeed, this kind of tape bonding has the disadvantage of having an immediate gluing of the glass on the tape as soon as the glass is touching this tape. It means that it is mandatory to fix the glass in the correct position at the early stage of the assembly process ie when the glass has to be fixed on the carrier.

SUMMARY

In view of the aforementioned aspects, it is an object of the present invention to propose a method for fabricating of a vehicle interior and/or exterior trim element which helps to overcome the above-mentioned disadvantages. In particular, it is an object of the present invention to propose a method for fabricating a vehicle interior and/or exterior trim element which allows for a secure connection between one or more functional elements and a bent glass panel, while reducing the risk of breakage of the glass panel or the functional element. In addition, it is an object of the present application to provide a similarly advantageous vehicle interior and/or exterior trim element.

These objectives are achieved by a method with the steps of the independent claim 1 and by a vehicle interior and/or exterior trim element with the features of another independent claim. Optional further features and further developments will become apparent from the dependent claims and the detailed description in conjunction with the accompanying drawings.

The proposed method for manufacturing a molded vehicle trim element comprises the step of:
  providing a carrier plate in a mold,
  providing a glass panel in the mold having at least a first region to be bent,
  cold bending the glass panel inside the mold in a requested shape,
  Injecting a soft material having a hardness of less than 90 Shore A to form the vehicle trim element comprising the carrier plate and the glass panel fixed together via this soft material,
  removing the assembly.

According to an embodiment the present invention, the soft material having a hardness of less than 90 Shore A is a thermoplastic polymer such as polypropylene, thermoplastic elastomers (TPE) such as olefinic thermoplastic elastomers (TPO), polyurethane, polyamide or soft polyvinyl chloride, Silicone or similar materials or any material suitable for reactive injection molding.

According to the present invention, the mold is designed to both give the final shape of the glass trim element and to fix it to the carrier by injecting a soft material between the glass panel and the carrier.

Thus, the present invention proposes a solution to industrialize the fixation of the glass panel to its carrier instead of use of tape as used previously and to reduce the cost of manufacturing.

According to one embodiment of the present invention, the soft material is injected over all the surface of the glass panel and/or the carrier, between the glass panel and the carrier, to lead to a full surface adhesion of the glass panel to the carrier.

By injecting the soft material over all the surface of the glass panel and/or the carrier, the stresses applied on the soft material which is used to bond the glass to the carrier are reduced and the glass panel is well bonded over all its surface to the carrier. Thus, deformation of the glass panel is avoided. Therefore, the bent glass panel is fixed to the curved carrier after bending to retain the curvature of the glass panel According to one embodiment of the present invention, the carrier may be provided in the injection mold, with the requested shape to fit with the requested final shape of the glass trim element.

According to another embodiment of the present invention, the carrier may be provided in the injection mold in a flat or substantially flat shape and bent in the requested shape into the injection mold. Thus, the mold may be used not only to bend the glass panel but also to bend the carrier and to inject the injection material to fix the glass panel to the carrier. Thus, the method to manufacture the vehicle glass trim element may be simplified and allows to gain time during the process.

According to the present invention, the injection mold comprises a mobile core of the mold and a fix cavity of the mold. The mobile core and/or the cavity are designed to give the requested shape to the glass trim element.

According to an embodiment of the present invention, in case of the glass trim element should have different curvatures at different regions, the mobile core of the mold and/or the fix cavity of the mold could comprise further mechanical means to cold bend the glass panel at requested curvature radius at different regions of the glass panel.

According to one embodiment of the present invention, the mechanical means to give a complex shape (different curvature radius at different regions) to the glass panel are chosen amongst mobile part added to the mobile core of the mold and/or the fix cavity of the mold. These mobile systems can be piloted by mechanical (spring for example), hydraulic or pneumatics means. Vacuum cup can be used to fix the glass in its final shape. Conventional vacuum system, similar to thermoforming vacuum shaping system could be also used to shape the glass accordingly.

After bending, the radius of curvature of the backside of the glass panel may amount to typically a few millimeters or centimeters. For slightly bent panels, the radius of curvature may be much larger.

According to one embodiment of the present invention, the mechanical mean is included in injection mold. In that case, some movable core are integrated to the fix and/mobile molds. This could be for example well known 2 component mold also known as 2K mold so that the carrier plate is made during the first shot of this 2K process. Then, after transfer of the part in another cavity or rotation of the injection mold, the glass is placed in the mold. The fixation is made in the mold for example by the use of vacuum cup and/or mechanical core coming in compression on the glass. Then, as a next step, the mold is for example closing and bend one area of the glass. After that, another mobile core is used to bend another region of the glass. Some specific core can again be used in order to adapt the parting line of the mold, from carrier cavity to bending cavity. At the end of this first stage, the glass is conformed to his desired shape and maintained in contact with the carrier, fixed in an injection mold.

So, the second stage can start. TPE injection can be used for example to fix the glass to the carrier.

According to one embodiment of the present invention, the soft material is made of an appropriate material to withstand the thermal expansion difference of the different materials of the carrier plate and the glass. Thus the use of a viscoelastic material as mentioned, such as preferably a glue (PU, Silicon, MS Polymer) or a thermoplastics elastomers with an appropriate shear strain between 10% to 300% or higher, in order to cope to the dimensional variations resulting from the different thermal expansion coefficient of the material used in the assembly.

Furthermore, the plastic carrier plate shape can be adapted to match every geometry of the glass, including, for example, a hole made in the glass to integrate a storage box in case of a central console. The storage box might be closed with a moving cover in glass as well to give the same high end level of finishing, and this cover could be connected to the rest of the body using the same interface through a plastic plate. The plastic interfacing structure offering the advantages that it can integrate a mechanism for such application.

According to one embodiment of the present invention, the carrier plate is made of a material chosen among thermoplastics such as for example Polybutylene terephthalate (PBT), Polycarbonate-Acrylonitrile Butadiene Styrene (PC-ABS), Polyamide (PA6), Polyamide copolymer (PA66), Polyoxymethylene (POM), Polypropylene (PP), Thermoplastic elastomers (TPE) or thermosets material such as Polyurethane (PUR), Epoxies (EP) with or without fillers to bring additional properties, such as glass fibers for mechanical reinforcement.

According to another embodiment of the present invention the carrier plate to provide an assembly that is integrated to motor vehicle and particularly car's interior body may be a carrier plate/frame made of metallic material such as zamac, aluminum, magnesium (Thixomolding). The carrier plate may be made of a fibre reinforced plastic . . . .

According to the present invention, the injection of material between the glass panel and the carrier plate allows to provide a vehicle trim element with a safety backing to improve the safety of the glass and prevent fragment to spread in the vehicle in case of breakage. Thus, upon an impact, the glass trim element will not break or the impact will not lead to a projection of fragments of glass. The damage on the glass will be limited to a potential crack in the glass.

The invention relates to the use of a plastic frame to be coupled with the glass on the back side and integrate to this plastic frame some function such as: reinforcement to meet specifications under loads, fixation points to the car inner body, fixation shape to the glass, geometrical aspects to match the expectations for fixation to the functional/decorative elements as well as for connection to vehicle interface.

The main functions of the carrier plate can be list as:
playing the role of an interface glass/body
reinforcing of the sub assembly that can advantageously be adapted in accordance with the glass used
using as well as support for other decorative elements such as bright molding edge, panels, . . .
being slightly visible and therefore have aesthetic function in some area without impacting the advantage brought by the glass
using as substrate and/or masking of different function, such as connecting to bring added value to the subassembly through the frame and/or the glass. Among others the added values and the connecting elements through the frame can be touch function in the glass, buttons, edge lighting, LEDs, screens, sound devices, vibrating devices . . .
using as partial support for small pieces of glasses that can be added to the main console in order to bring decorative aspects. The decoration can be, among others, colored glass, glass with engravings, glass with light integration and the frame used as support for the cables.
Reducing noise/vibration between the glass cover and the main inner body of the motor vehicle
Ensuring the minimum glass deformation but allowing the appropriate energy absorption in occurrence of specified shock/impacts.

According to the present invention, the carrier plate is provided with at least a hole to inject the soft material between the glass panel and the carrier plate.

The carrier plate may be provided, on its face expected to be in contact with the glass panel, with recess which is filled with the injection material to perform the adhesion/fixation of the glass panel onto the carrier plate.

The glass panel is typically flat before the cold bending process, although it might be slightly bent. The carrier ensures that the glass panel remains in its shape, during the bending process. Hence, the stiffened region is suited for the attachment of functional elements which benefit from a surface with a shape which is adapted to the element. For example, the functional element may be a flat display. The functional element may be attached to the stiffened region prior to bending the glass panel or after bending the glass panel. If the functional element is attached to the stiffened region prior to bending the glass panel, the suggested method may prevent detachment of the functional element and breakage of the functional element during the bending process. For example, the display may be attached to the backside of the glass panel in a region which corresponds to the stiffened region. In this embodiment, the glass panel is at least partially optically transparent. The display may be attached to the backside of the glass panel before bending the glass panel.

The cold forming process according to the present invention is typically fast and energy efficient and therefore helps to reduce costs of production. The cold forming process is typically performed at room temperature and/or below the glass softening point. If functional elements are attached to the glass panel prior to bending, the temperature may not exceed the degradation temperature of the functional elements.

The present invention further relates to the vehicle interior trim part. The vehicle interior trim part comprises the cold formed glass panel, fixed to a carrier by injection molding in one of the embodiment. The vehicle interior trim part may comprise a display, which is attached to the backside of the glass panel in a region which corresponds to for example a bent region. A front side of the glass panel typically faces a vehicle interior. The front side of the glass panel typically forms a visible side of the vehicle interior trim part, when the vehicle interior trim part is installed in a vehicle.

In particular, the trim element may comprise an opening and/or a functional element, for example a display. The opening of the glass panel may be suited for receiving a functional module, such as an air vent and/or a trash can.

The glass panel may comprise soda lime and/or aluminosilicate. The glass panel may be chemically and/or thermally strengthened. A thickness of the glass panel may be at least 0.01 mm and/or at most 2 mm.

According to another advantageous embodiment of the invention, which may be combined with the preceding embodiment, the glass sheet can be coated with a layer or a film which makes it possible to modify or neutralize the colour which may be generated by for example the presence of the chromium (for example a coloured PVB film).

The glass sheet according to the invention may advantageously be chemically or thermally tempered in order to avoid scratches and to enhance the resistivity of the upper part of the center console.

According to another embodiment of the invention, the at least one trim element is made of chemically strengthened glass sheet, flat or bended. Typically, chemical strengthening is performed by exchanging Na+ ions by K+ ions at the surface of the glass sheet by dipping the glass sheet in a molten salt bath at a temperature below the glass transition temperature. Advantageously, the bath consist of high purity KNO3 and the treatment is performed at temperature between 350° C. and 470° C., for 1 to 24 hours. Chemical strengthening is preferably applied for glass sheet of thickness below 3 mm, more preferably below 2 mm and even more preferably below 1 mm, or even better below 0.7 mm.

According to one embodiment of the invention, the glass sheet is coated with at least one transparent and electrically conducting thin layer. A transparent and conducting thin layer according to the invention can, for example, be a layer based on SnO2:F, SnO2:Sb or ITO (indium tin oxide), ZnO:Al or also ZnO:Ga.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. A textured glass sheet may be also used to limit the reflection inside the vehicle. Etching or coating techniques may as well be used in order to avoid reflection.

According to another embodiment, the glass sheet is coated with at least one anti-fingerprint layer or has been treated so as to reduce or prevent fingerprints. This embodiment is also advantageous in the case of use of the glass sheet of the invention as front face of a touchscreen. Such a layer or such a treatment may be combined with a transparent and electrically conducting thin layer deposited on the opposite face. Such a layer may be combined with an antireflection layer deposited on the same face, the antifingerprint layer being on the outside of the stack and thus covering the antireflection layer.

According to the applications and/or properties desired, other layers can be deposited on one and/or the other face of the glass sheet according to the invention.

The glass sheet according to the invention may be a glass sheet obtained by a floating process, a drawing process, a rolling process or any other process known to manufacture a glass sheet starting from a molten glass composition.

According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have preferably a thickness varying between 0.1 and 2 mm, for example reasons of weight.

According to the invention, the glass sheet presents a curvature to correctly fit with the upper part of the center console and its particular design.

In order to provide a better esthetic of the center console, the trim elements may be made of a digital or silk screen printed glass sheet, an etched glass sheet, a painted/enameled glass sheet, a casted glass sheet, an anti-bacterial glass sheet, a colored float glass sheet.

According to another embodiment of the invention, the trim elements are made of laminated glass sheet. According to this embodiment, at least one thermoplastic interlayer is used to laminate at least two glass sheets. Advantageously, a colored or active interlayer may be present between the at least two glass sheets. The interlayer or a layer between the glass and the interlayer might have a low refractive index (<1.43, <1.4, <1.38, . . . <1.3) to ensure TIR in the upper glass, if compatible from IR absorption point of view.

The present invention applies to trim or decorative elements present in the interior and/or exterior of a vehicle as doors handles contours, door panels, trim elements of the dashboard, back of seats . . .

Thus, the invention also relates to an assembly for motor vehicle's interior and more particularly for a car's interior (or exterior) comprising a glass trim element and a carrier plate as described above. The advantages of such as assembly are the same cited above.

The present invention concerns also an bending mold to cold bend a glass panel and a mold to inject the glass panel to a carrier plate according to the method of the present invention. The bending mold according to the present invention comprises:

a mold having a mobile core and a fix cavity, the mobile core and/or the fix cavity being designed to cold bend a glass panel, injection unit to inject a soft material.

According to the present invention, the bending mold comprises a mobile core adapted to receive the carrier plate on which the glass panel will be fixed thanks to the soft material injected from injection units preferably provided in the cavity of the mold.

The bending mold may comprise mechanical means to cold bend the glass panel having a complex shape.

The present invention concerns a vehicle interior or an exterior glass trim obtained by the process described above.

BRIEF DESCRIPTION OF THE DRAWINGS

Exemplary embodiments will be described in conjunction with the following figures.

DETAILED DESCRIPTION

Figure 1:
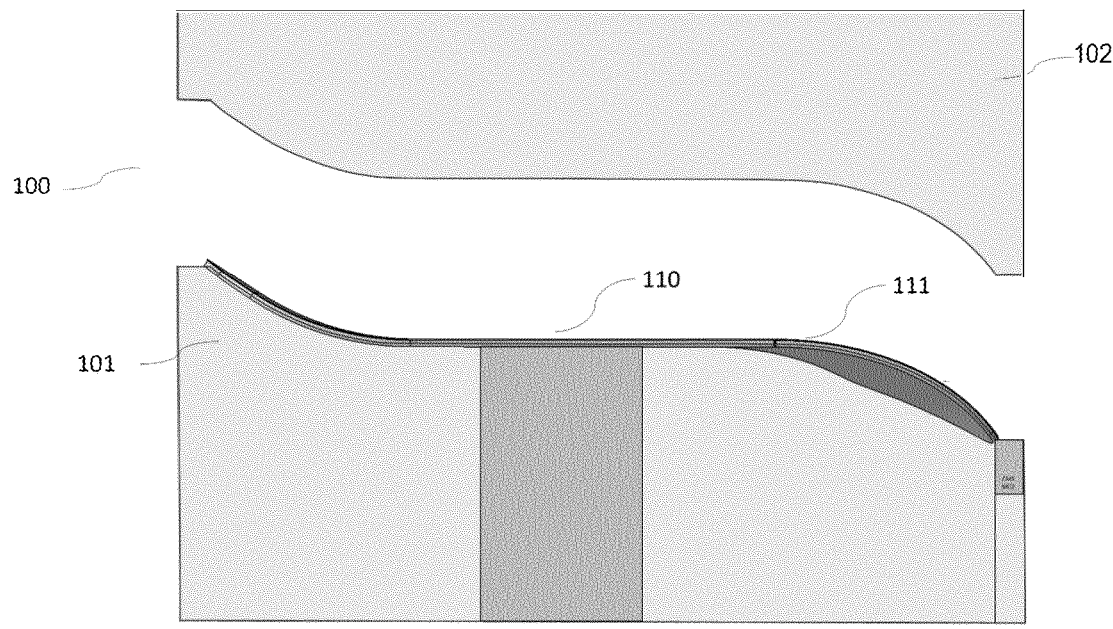
FIG. 1 shows a sectional view of the 2K injection mold according to one embodiment of the present invention after injection of the carrier plate.

Corresponding features shown in FIGS. 1 to 7, thee following figures are denoted using the same reference numerals.

For avoidance of doubt, the present invention is applicable for all means of transport such as automotive, train, plane . . . .

The following description is directed to a method for manufacturing a vehicle interior trim element. However, it is applicable to vehicle exterior trim element.

FIG. 1 illustrates mold to implement the method of the method for manufacturing a molded vehicle interior trim element according to one embodiment of the present invention.

FIG. 1 illustrates a mold 100 allowing a 2-components (2K) injection molding for manufacturing a vehicle interior trim element 1. The carrier plate 106 is this particular embodiment is formed by mold-injection. The mold 100 comprises a mobile core mold 101 and a cavity mold 102. The mobile core 101 and cavity 102b molds are designed according the final shape requested for the vehicle trim element. The cavity 102b of the mold 100 is used to make the carrier plate 106. The cavity 102b may be one of the side of the mold used to make the carrier plate 106. The mold 100 is provided with a cavity 102 to inject the soft material 120 and shape the glass panel 107, the mobile core 101 changes its position to be faced to the cavity 102. According to one embodiment of the present invention, the carrier plate 106 is made of polypropylene. It is understood that it may be made of another injecting molded material as ABS . . . . Injection mold machine are well-known, the mechanism will not be described here in detail. According to the present invention, the carrier plate 106 may be provided with an opening for example to place within a display. In this particular embodiment, the carrier plate is designed as console or a dashboard for a vehicle. The console trim element may extend between the left and right back seats. The upper trim element may cover the upper part of the center console from the mid part of the center console to part just above the dashboard. This trim element may be substantially flat or with a curvature. Some access to functional parts may be provided through this trim element. The middle part presents a curvature to correctly fit with the design of the center console. The middle part may show an opening to have an access to functional buttons to control for example sound, air conditioning . . . . The opening may be covered by another piece of glass sheet which may be openable, for example by a sliding movement. However, in one other embodiment of the invention, the functional buttons placed into the trim elements may be replaced by touch functions with lead to suppress anesthetic functional buttons which generally protrude from the center console. This trim element in this specific embodiment presents some holes for example storage compartment or for cup holders systems.

In another embodiment of the invention, the upper trim element extends to the dashboard and integrates a display panel as such a GPS, CD/audio player screen . . . .

According to one embodiment of the present invention, the mobile core 101 of the mold 100 may comprise a second mobile core 115 to help to handle the glass when the carrier plate 106 is provided with an opening for example for a display. The second mobile core 115 as a mechanical means is provided to give a complex shape (different curvature radius at different regions) to the glass panel. The second mobile core 115 can be piloted by mechanical (spring for example), hydraulic or pneumatics means.

Figure 2:
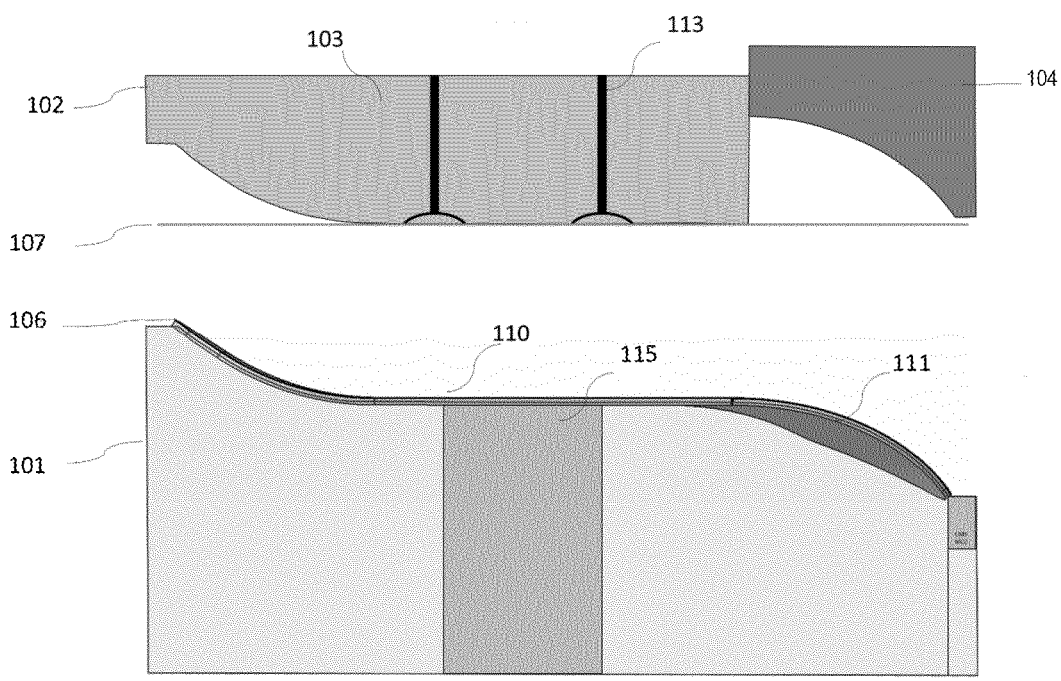
FIG. 2 shows a sectional view of the injection mold according to one embodiment of the present invention before bending the glass panel and in open position.
Figure 3:
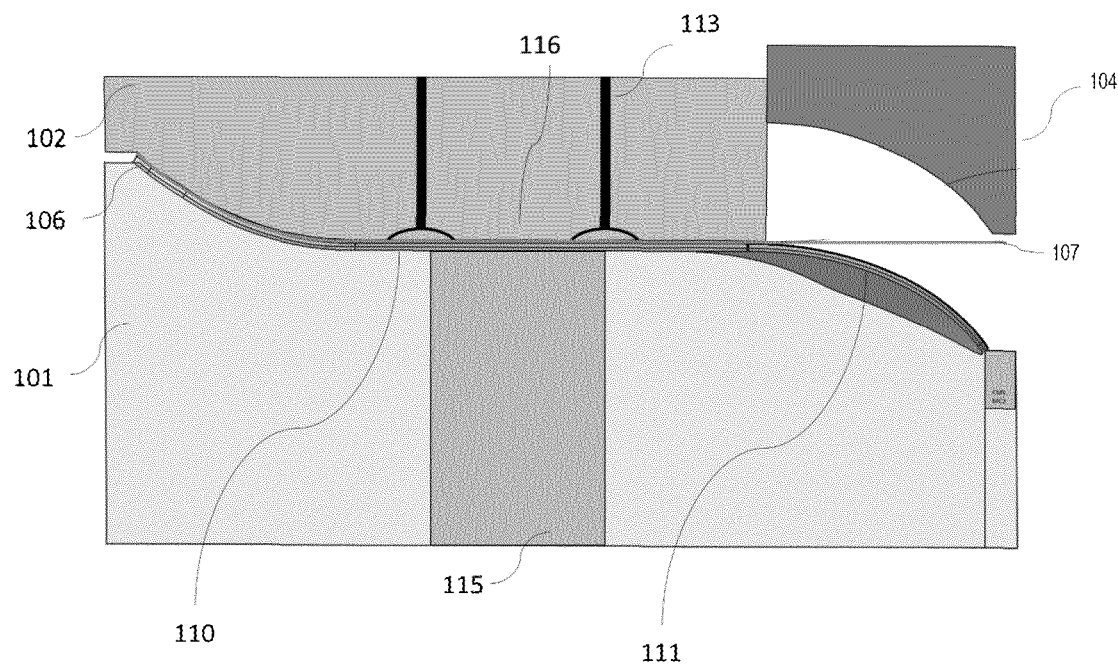
FIG. 3 shows a sectional view of the injection mold according to one embodiment of the present invention after bending a first region of the glass panel by closing of the mold.
Figure 4:
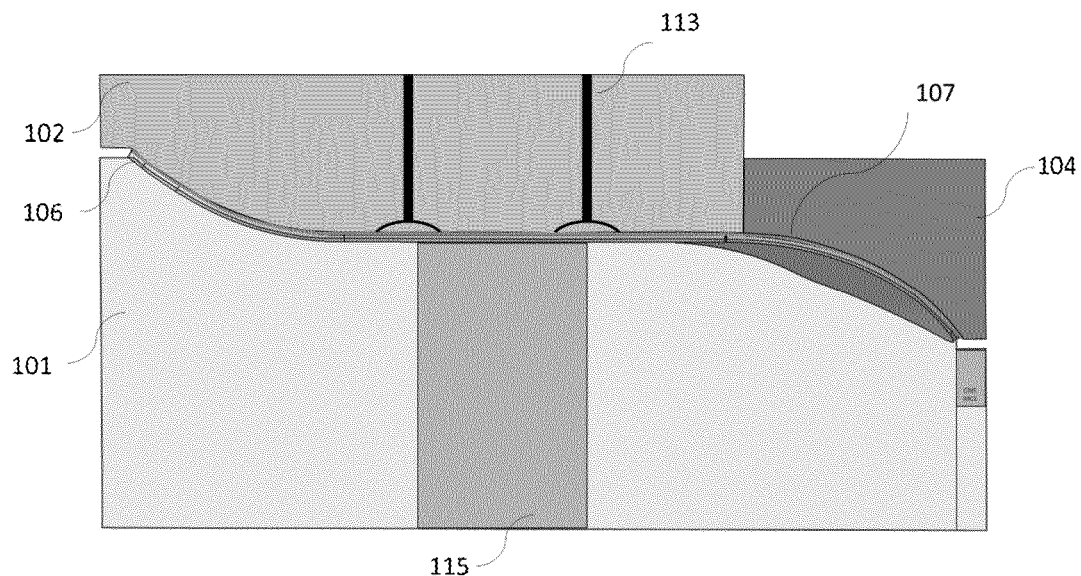
FIG. 4 shows a sectional view of the injection mold according to one embodiment of the present invention after bending the second region of the glass panel, by use of mechanical mean integrated to the fix side of the mold, FIG. 5a and FIG. 5b shows a sectional view of the injection mold according to one embodiment of the present invention after bending a first region and the second region of the glass panel, and injecting the molding material.

According to one embodiment of the present invention as shown in FIG. 2, a carrier plate 106 having a shape according the final requested shape of the trim element is provided on the mobile core 101 of the mold 100. The carrier plate 106 may have a first region 110 flat or with a first curvature and a second region 111 with a second curvature. According to this embodiment, the vehicle trim such as dashboard has a complex shape. To cold bend the glass panel 107 to be fixed to the carrier plate 106 to form the vehicle trim element, a glass panel 107 is handled inside the mold 100 by the cavity 103 of the mold 100 thanks for example with vacuum cum 113. Vacuum cup 113 can be used to maintain the glass panel 107 and to fix the glass in its final shape as shown in FIG. 2. Conventional vacuum system, similar to thermoforming vacuum shaping system could be also used to shape the glass accordingly. The cavity 102 is a cavity for the injection of the soft material according to the present invention between the carrier plate 106 and the glass panel 107. According to this embodiment, the mobile core 101 may be provided with a second mobile core 115 as described previously in the case of the carrier plate 106 and the glass panel 107 are provided with an opening. The cavity of the mold 100 may be provided with a mobile core 104 to handle the glass panel and to help to bend the glass panel with a complex shape. The cavity 102 may be provided with a mobile core 104 to bend the glass panel in a second region 117. The second mobile core 104 moves toward the mobile core 101. The mobile core 101 on which the carrier plate 106 is provided moves toward the cavity 102 of the mold 100 to bring the carrier plate 106 in contact with the glass panel 107. The pressure exerted between the mobile core 101 and the cavity 102 allows to cold bend a first region 116 of the glass panel as shown in FIG. 3. The glass panel 107 is fixed to its shape thanks to vacuum cup 113. Then, the mobile 104 of the cavity 102 of the mold 100 goes down toward the mobile core 101 to bend the second region 117 of the glass panel 107 as shown if FIG. 4 to give the final shape of the glass panel 107 on the carrier plate 106.

Figure 5A:
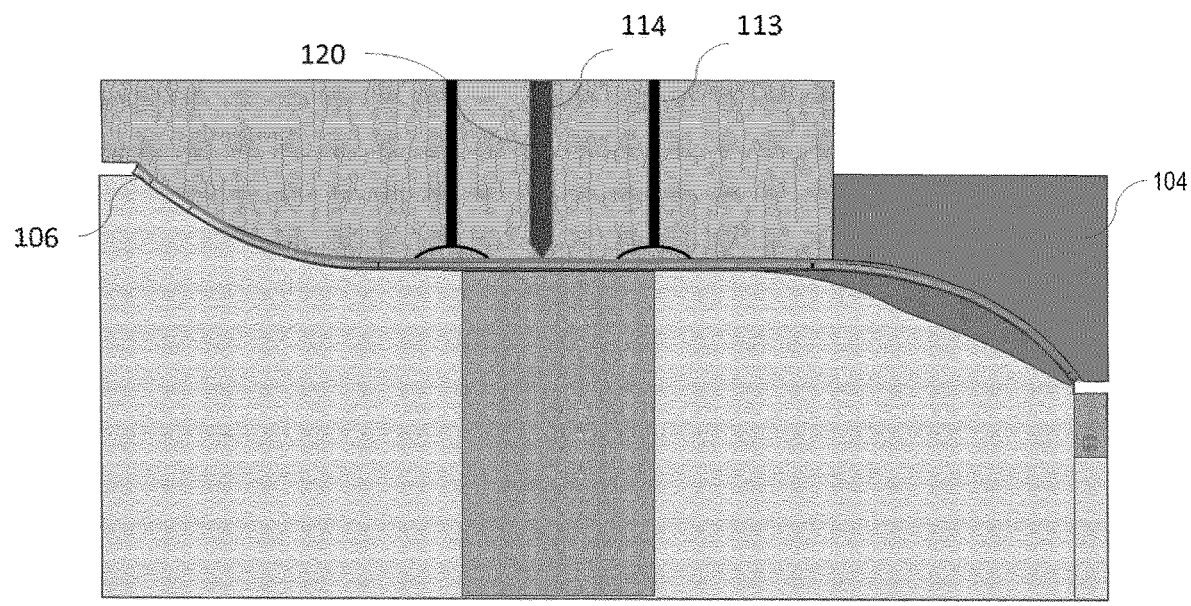
Figure 5B:
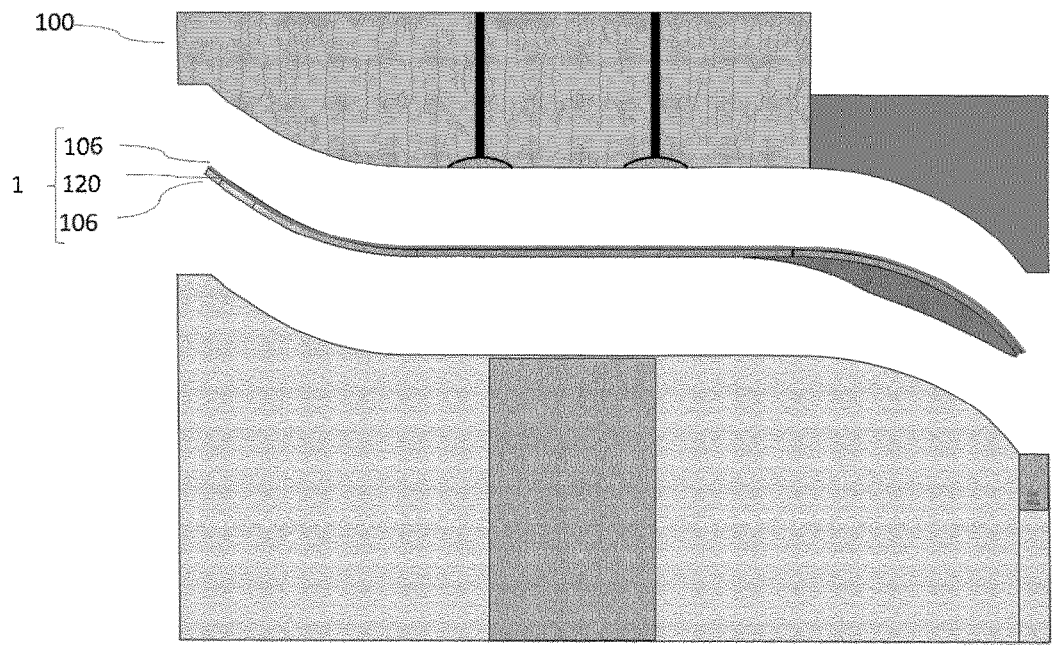

As shown in FIG. 5b, Once the final shape of the vehicle trim element 1 is done, the soft material 120 is injected between the carrier plate 106 and the glass panel 107 through the injection units 114 provided in the cavity 102 of the mold 100 to fix the vehicle trim element 1. The soft material 120 is for example a thermoplastic elastomer (TPE) or polyurethane or any suitable material for injection molding. The carrier plate may be provided, on its face expected to be in contact with the glass panel, with recess which is filled with the soft material to perform the adhesion/fixation of the glass panel onto the carrier plate Once the soft material 120 injected between the glass panel 107 and the carrier plate 106, the mold 100 opens up to release the vehicle trim element 1 as shown in FIG. 5*b*.

Figure 6:
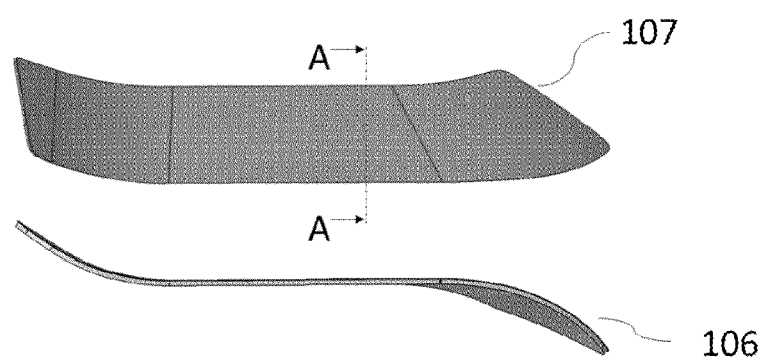
FIG. 6 shows a exploded view of the glass panel and the carrier plate after the cold forming and injection process according to one embodiment of the present invention.

The FIG. 6 shows an exploded view of the glass panel 107 and the carrier plate 106 before the assembly. The carrier plate 106 comprises a first region 110, a second region 111 and a third region 112. The three regions have different radius of curvature determining the complexity of the shape of the trim element and more particularly the complexity of the bending of the glass panel 107 with also a first region 116, a second region 117 and a third region 118.

Figure 7:
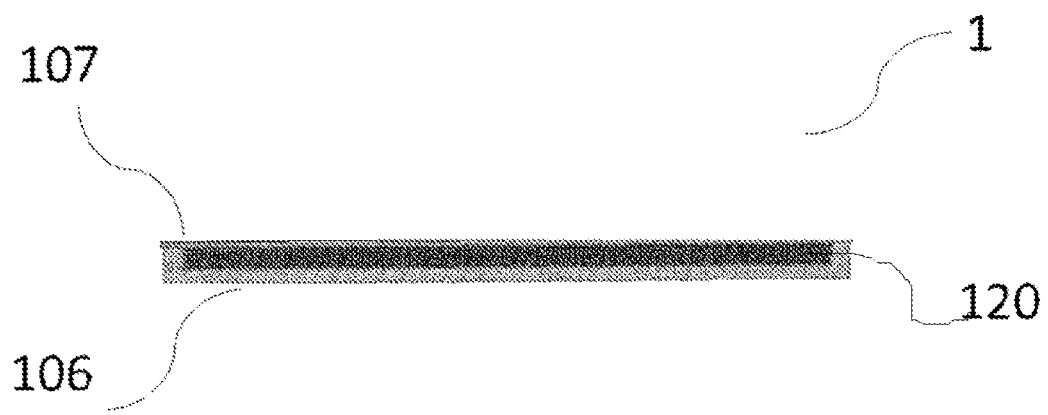
FIG. 7 shows a sectional view of a vehicle interior trim element according to an embodiment of the present invention.

The FIG. 7 shows a cross section of the vehicle trim element comprising a carrier plate 106 assembled to the glass panel 107 with a soft material 120.

According the present invention the carrier plate may be made of any material as described above. The glass panel may comprise soda lime and/or aluminosilicate. The glass panel may be chemically and/or thermally strengthened. A thickness of the glass panel may be at least 0.01 mm and/or at most 2 mm. The soft material may be made of any material as described above. The trim element may a simple shape or a complex shape requesting means in the mold to bend the glass panel (a the carrier panel) according different specifications requested by the car maker.

According to one embodiment of the present invention, the trim or decorative elements may be present in the interior of a motor vehicle and particularly a car, as doors handles contours, door panels, trim elements of the dashboard, back of seats . . . .

According to another embodiment of the invention, the functional parts may be directly managed from the trims elements thanks to "touch function" providing a touch panel. Thus, the trims elements made of glass sheet may host different functionalities around electronic gadgetry and vehicle control information, connectivity, touch, display and audio. Thus the upper part of the center console may be made of glass sheet in a larger part of the upper part of the center console, without anesthetically buttons to control for example audio control volume and on/off, engine start/stop system, head up display control system, glazing opening, display system control, allows circulation of information display in the car on the different glass panels, control of SMART glazings, etc. According to this embodiment, the touch panel may be curved for improved ergonomics conditions of drivers/passengers (view adaptation and glare related issues). Cavities on trim elements can be processed to provide haptic feedback on a plain glass sheet for easy detection of touch sensors (for safety reason of the driver).

According to another embodiment of the invention, some lighting means as for example OLED, LED, special glass paint/enamel backing, may be integrated into the center console or on its edges. A polycarbonate plate may be provided behind the glass trim element in order to better diffuse the light.

In another preferred embodiment of the invention, the trim elements are made in one piece of glass sheet extended from the rear of the console body to the dashboard wherein openings are arranged to provide an access to functional parts. Such openings may be covered by openable piece of glass sheet.

The invention claimed is:

1. A method for manufacturing a molded vehicle trim element, the method comprising:
    providing a mold for injection molding comprising a mobile core of the mold and cavity of the mold to give a final shape of the vehicle trim element,
    providing a carrier plate in the mold,
    providing a glass panel adjacent the carrier plate in the mold having at least a first region to be bent,
    cold bending the glass panel inside the mold in a requested shape to form a bent carrier plate,
    injecting a soft material to form the vehicle trim element made of bent carrier plate and glass panel fixed together via the molding material,
    removing the vehicle trim element from the mold.

2. The method for manufacturing a molded vehicle trim element according to claim 1, wherein the vehicle trim element is a vehicle interior trim element.

3. The method according to claim 1, wherein the glass panel has a second region to be bent.

4. The method according to claim 1, wherein the carrier plate comprises an opening.

5. The method according to claim 1, wherein the mold comprises a mobile core and/or a cavity further comprising means to cold bend at least a first region and a second region of the carrier plate and/or at least a first region and a second region of the glass panel.

6. The method according to claim 5, wherein the mobile core further comprises a second mobile part.

7. The method according to claim 1, wherein the cavity of the mold comprises a fixed part and a mobile part further comprising means to maintain the glass panel.

8. The method according to claim 1, wherein the carrier plate is made of a thermoplastic material or metallic material.

9. The method according to claim 8, wherein the carrier plate is made of a material selected from the group consisting of polybutylene terephthalate, polycarbonate-acrylonitrile butadiene styrene, polyamide PA6, polyamide copolymer PA66, polyoxymethylene, polypropylene, thermoplastic elastomers, a thermosets material, and epoxies with or without fillers.

10. The method according to claim 1, wherein the glass panel is provided with a primer.

11. The method according to claim 1, wherein the soft material is selected from the group consisting of thermoplastic elastomer, Polyurethane, soft PVC, and silicone.

12. The method according to claim 1, wherein the glass panel is provided with a primer with a silane component.

13. The method according to claim 9, wherein the thermosets material is polyurethane.

14. The method according to claim 7, wherein the means to maintain the glass panel is a suction cup.

\* \* \* \* \*